Figure 1:
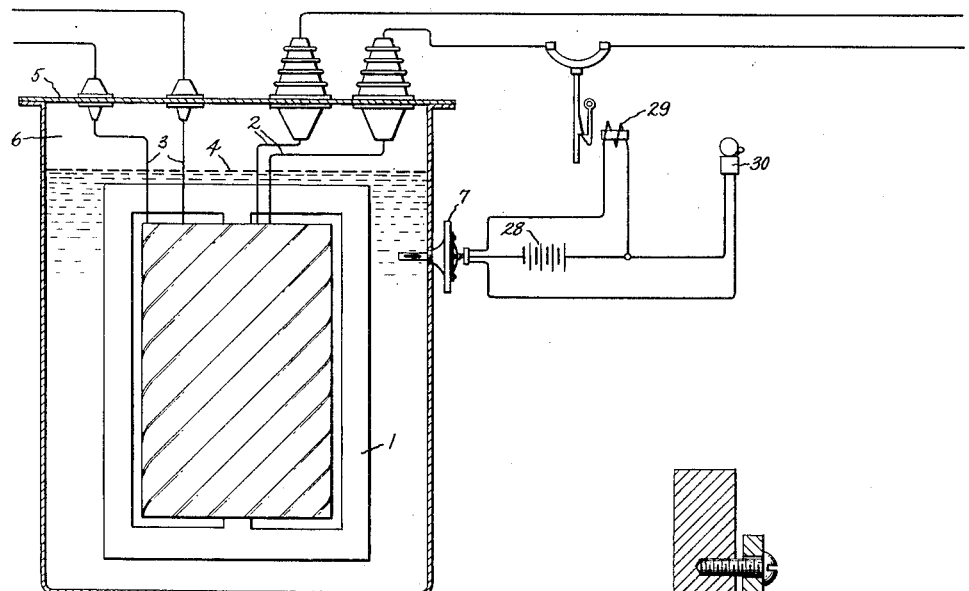

May 15, 1951  J. R. BARR  2,553,291

PRESSURE TEMPERATURE RELAY

Filed June 18, 1948  2 Sheets-Sheet 1

Inventor:
James R. Barr,
by Ernest F. Britton
His Attorney.

May 15, 1951  J. R. BARR  2,553,291
PRESSURE TEMPERATURE RELAY
Filed June 18, 1948  2 Sheets-Sheet 2

Inventor:
James R. Barr,
by Ernest F. Britton
His Attorney.

Patented May 15, 1951

2,553,291

UNITED STATES PATENT OFFICE 2,553,291

PRESSURE TEMPERATURE RELAY

James R. Barr, Pittsfield, Mass., assignor to General Electric Company, a corporation of New York Application June 18, 1948, Serial No. 33,829

6 Claims. (Cl. 175—294)

My invention relates to protective devices and more particularly to improvements in such devices for liquid-immersed electrical apparatus such as transformers, reactors, motors and the like.

It is common practice to have a transformer or other electrical apparatus immersed in an insulating liquid within a sealed casing which is only partially filled with the liquid so that there is a space filled with air or other gas above the surface of the liquid. Normal changes in the temperature of the liquid due to different loads and ambient temperature conditions cause the liquid to expand and contract with corresponding normal changes in the pressure of the gas above the liquid. An electrical fault in the apparatus, such as the breakdown of insulation and an arc, however, will cause evolution of additional gas and an abnormal increase in pressure within the space of the liquid. On the other hand, the pressure in the casing may be reduced below normal due to leakage and, if such trouble is allowed to continue, the amount of liquid in the casing may be so reduced as to impair its insulating ability to the extent that further operation of the apparatus will be unsafe.

For many years the problem of protecting liquid-immersed electrical apparatus from short circuits or similar serious disturbances has been recognized and a number of methods and various types of devices have been developed. One of the common type of protective devices used has been a relay which operates from the pressure developed within the casing containing the liquid insulated apparatus. In general such a relay has been little more than a pressure operated switch with or without an automatic reset. Various forms of pressure sensitive members have been employed to actuate the protective relay and have included such means as flexible diaphragms and pressure responsive bellows. In some applications the flexible diaphragm has been mounted in the side wall of a transformer casing in such a manner as to be capable of closing a protective circuit whenever an increase of pressure within the casing forced the diaphragm outward. Other applications have provided a pressure sensitive bellows mounted inside the casing for opening the transformer circuit when the pressure in the casing reached a predetermined maximum value.

In calibrating this relay it has been necessary to take into consideration the fact that the pressure within the casing increases as the transformer warms up in the course of normal operation due to the cooling fluid expanding and thus compressing the air or gas above it. As this is a perfectly normal condition and since this type of relay is not responsive to time, it has been necessary to adjust the relay to trip at a pressure appreciably above the maximum value of pressure that the transformer will reach under normal loading. Obviously, if a failure occurs at or near no-load, the relay will not trip until the pressure, due to the oil expanding or fault gases collecting, reaches this high value which results in a serious delay.

Recognizing the shortcomings of this type of pressure switch, differential-type pressure relays were proposed which would be sensitive to the rate of pressure increase. It was essential that the protective device respond to a rapid increase in pressure resulting from trouble in the apparatus but that no response occur to the slow increase in pressure resulting from normal temperature and pressure changes due to changes in load and ambient temperature conditions.

Several variations in pressure switches of the differential type have been developed. One of these made use of a collapsible bellows for actuating the contacts in the protective circuit. The bellows had a small opening in one end and was mounted inside the casing enclosing the transformer above the liquid level. Under normal operating conditions there was a gradual interchange of air between the inside and the outside of the collapsible member to equalize the pressure therebetween. As long as the pressure on the opposite sides of this member was the same, no movement of the bellows resulted. However, upon any sudden increase in pressure the collapsible bellows was compressed to cause engagement of the contacts. Thus the operation of the pressure-operated switch was dependent upon the rate of change in pressure within the casing.

Another form of pressure switch of the differential type has been arranged to float on the surface of the insulating liquid. This protective device comprised a hollow vessel having an opening at its lower end and a restricted opening in its upper portion. The vessel was mounted on a float in the shape of an annular ring and a second float was located within the lower opening of the vessel. Each float carried a contact for controlling the protective circuit. The small opening in the top of the vessel permitted a slow interchange of gas between the inside of the vessel and the space outside the vessel above the liquid. The pressure inside and outside of the vessel remained substantially equal as long as any change in the pressure of the gas outside the vessel took place slowly. If any trouble in the transformer caused the pressure of the gas to increase rapidly, the pressure inside the vessel would increase at a slower rate, thus allowing the small float to rise inside the vessel and connect the two contacts.

Such types of differential pressure switches have been subject to difficulty in calibration and there has always been the danger that the restricted orifice might become clogged.

In accordance with this invention there is provided an improved protective device or relay in which there is a differential action between opposed temperature and pressure responsive actuating means. During normal operation the two actuating means effectively cancel each other, but during abnormal conditions the pressure responsive actuating means overpowers the temperature responsive actuating means.

Therefore, one of the principal objects of this invention is to provide an improved protective device for transformers or other liquid-immersed electrical apparatus which will respond to any pressure condition not directly the result of a corresponding change in liquid temperature such as the increase in pressure caused by a fault in the apparatus.

Another object is the provision of a protective device for transformers or other liquid-immersed electrical apparatus which will respond to decreases in pressure below normal caused by leakage from the housing containing the apparatus.

A further object of this invention is to provide an improved protective device for use with liquid-immersed electrical apparatus which will respond to both over-normal and under-normal pressures in the housing containing said apparatus.

Still another object of this invention is the provision of a pressure-temperature relay that is directly responsive to changes in temperature and pressure.

A further object of this invention is to provide a pressure-temperature relay for use with liquid-immersed electrical apparatus responsive to both over-normal and under-normal pressures in the housing containing said apparatus and wherein the pressure responsive member and the temperature responsive member of said relay are positively connected.

Another object of this invention is the provision of a pressure temperature relay for use with liquid-immersed electrical apparatus wherein the effective face area of the pressure responsive member may be readily changed so as to accommodate different designs of apparatus in a single relay.

Other objects and advantages will appear from the following description taken in connection with the accompanying drawings and its scope will be pointed out in the appended claims.

Figure 2:
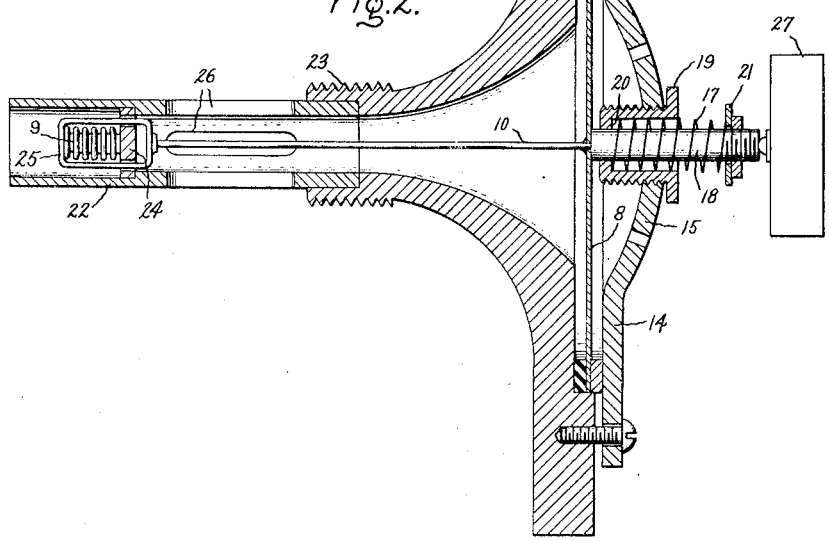
Figure 3:
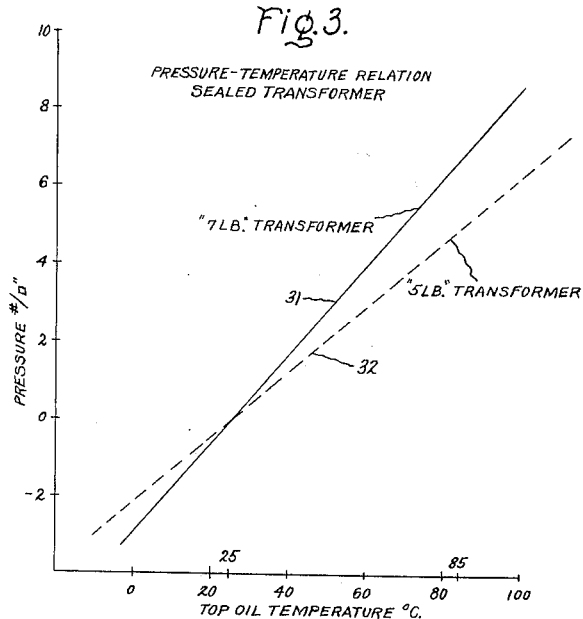
Figure 4:
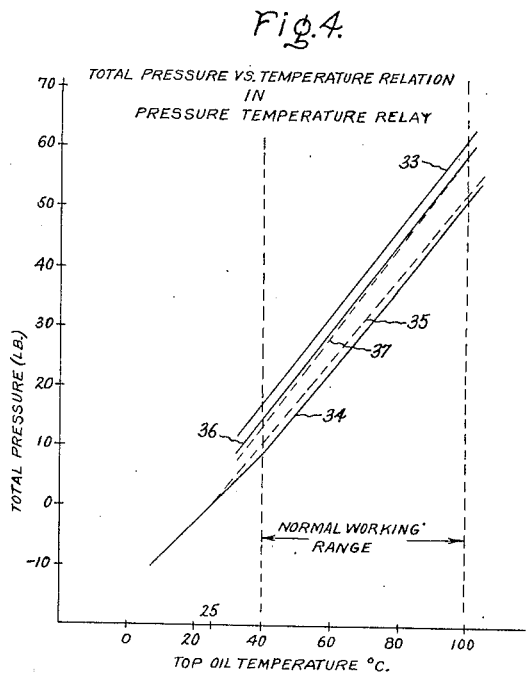

Referring now to the drawings, Fig. 1 shows a sectional view of a liquid-immersed transformer provided with a protective device constructed in accordance with the invention; Fig. 2 is an enlarged sectional view of the protective device; Fig. 3 shows a theoretical pressure-temperature relation existing within a sealed transformer when the oil expands and compresses the gas in the space above the liquid; and Fig. 4 shows the total pressure existing in the individual parts of a representative assembly of a pressure temperature relay and transformer. Like reference characters indicate similar parts in the different figures of the drawings.

The transformer 1 shown in Fig. 1 and comprising a primary circuit 2 and a secondary circuit 3 is immersed in a body of insulating liquid 4 within a sealed casing 5, the liquid 4 partially filling the casing 5 to leave a volume of air or other gas 6 above the surface of the liquid. Change in the temperature of the liquid 4, due to changes in load and ambient temperature conditions, will cause corresponding changes in the temperature, volume, and pressure of the gas 6. An electrical fault occurring in the transformer, such as a break-down of insulation accompanied by an arc, however, will cause evolution of gas and a consequent increase in pressure within the casing 5 without a corresponding change in temperature. Therefore, it is necessary in providing a suitable protective device that said device should respond to an increase in pressure resulting from an electrical fault in the apparatus but no response should occur to an increase in pressure resulting from normal temperature changes due to changes in load and ambient temperature conditions.

The protective device 7, as shown more clearly in Fig. 2, is a form of pressure-temperature relay and comprises a pressure responsive diaphragm 8 and a thermal responsive bellows 9 so constructed and arranged as to normally counterbalance the actions of each other. The diaphragm 8 and the bellows 9 are connected for opposing action by means of a rod 10. The diaphragm is located at the diverging end of a funnel-shaped housing 11 and is positioned between two annular gaskets 12 and 13. Gasket 12 is preferably constructed of a resilient material, such as soft rubber, while backing gasket 13 should be constructed from a hard material, such as steel. Gasket 12, diaphragm 8 and backing gasket 13 are all securely held against the end of housing 11 by means of a plate 14 which is in turn bolted to the housing. Plate 14 is constructed with a dish-shaped central portion 15 extending away from the diaphragm and has a substantially flat annular portion or rim 16. A spring 17 is provided to aid the action of the diaphragm 8 and assist in counterbalancing the force exerted by the bellows 9. Spring 17 is coiled about an extension 18 of rod 10 and is housed within a threaded bushing 19 which is threadedly inserted through a central opening in the dished portion 15 of plate 14. The spring 17 is held under compression between an internal shoulder 20 at the end of the bushing 19 and an external flange 21 positioned near the end of extension 18 of rod 10. Both bushing 19 and external flange 21 are adjustable so that the force exerted by spring 17 may be varied for calibration purposes. A protective tube 22 surrounds bellows 9 and one end of said tube is securely positioned within the opening at the converging end of housing 11. Said end portion of housing 11 is provided with an external thread 23 so that protective device 7 may be secured to the wall of casing 5, thus allowing the tubular end of said protective device to project through said wall and be immersed in the body of insulating liquid contained therein. The stationary end of bellows 9 is anchored to a plate 24 which is located within tube 22 and rigidly held to prevent movement thereof. The free end of bellows 9 is surrounded and positioned against clamp strap 25 and said strap is attached to the end of rod 10 for transmitting the pressure from the bellows to diaphragm 8. The wall of tube 22 is provided with a series of openings 26, thus allowing liquid 4 to enter the housing 11 and transmit pressure against diaphragm 8.

Switch 27 is positioned against the end of extension 18 of connecting rod 10 and is designed to be actuated by movement of said rod. This switch is of the sequence type and has two "on" positions separated by a neutral or normally "off" position for controlling the protective circuits. A spring in said switch is adjusted so that under normal temperature-pressure conditions the switch will be balanced in a neutral position.

In the "on" position resulting from an over-pressure condition existing in casing 5, the protective circuit, as shown in Fig. 1, includes a battery 28 and tripping coil 29 of a circuit breaker for disconnecting the transformer. In the "on" position resulting from under-pressure condition existing in casing 5, the protective or auxiliary circuit includes battery 28 and a signal 30, such as a bell or lamp, for attracting the attention of the attendant and to warn him of the under-pressure condition. In this way, unbalances from under-pressure, as well as over-pressure, sufficient to deflect rod 19 and operate switch 27 will indicate under-pressure caused by leaks or over-pressure caused by faults.

Different designs of transformers may have different ratios of air to oil volumes; consequently, the maximum pressure at a temperature of 85 degrees C. may be as high as 7 to 8 lbs. gauge in one transformer, and as low as 5 lbs. in another. Fig. 3 shows a theoretical pressure temperature relation existing within a sealed transformer when the oil expands and compresses the gas in the space above the liquid. Two typical conditions are shown, one 31 in which the air space has been selected to give a theoretical pressure of 7 lbs. per square inch when the transformer has heated from 25 degrees C. to 85 degrees C. (a maximum condition), and the other 32, a condition giving 5 lbs. per square inch at 85 degrees C. (a minimum condition).

In the general operation of the protective device the pressure of the bellows 9 balances the pressure developed within the casing 5 which acts upon diaphragm 8. Since it is desirable to accommodate all transformer designs in a single relay, a variety of diaphragm areas is provided for. As shown in Fig. 2, rim 16 of plate 14 and diaphragm 8 form an annular space therebetween for receiving annular backing gasket 13. Said gasket, as well as gasket 12, may have various annular widths and thus the effective area of the diaphragm may be changed by merely changing the annular width of the gaskets 12 or 13 or both.

The pressure adjustment spring 17 is primarily effective in setting the cold tripping pressure of the relay while the relation of the areas of the bellows 9 and the portion of the diaphragm 8 exposed to the liquid determines the slope of the operating curve.

Fig. 4 shows the total pressure existing in the individual parts of a representative assembly of a pressure-temperature relay and transformer. Line 33 shows the total pressure-temperature relation which would result from using a bellows of standard dimensions and filled with a methyl chloride. Line 34 shows the theoretical total diaphragm pressure-temperature relation in a "7 lb." transformer design with the proper diaphragm diameter, and line 35 shows similar characteristics of a "5 lb." transformer design. It will be noted that both curves 34 and 35 pass through zero total pressure at 25 degrees C. and that the slopes of the two curves have been made nearly parallel by selecting the proper diaphragm diameter. Line 36 shows the total pressure-temperature relation in a "7 lb." transformer design of the diaphragm plus a spring adjusted to a 6 lb. pull. Line 37 shows the same relation in a "5 lb." transformer design but with the spring adjusted to a 4 lb. pull so as to make lines 36 and 37 nearly coincide. It will now be noted that lines 36 and 37 are substantially parallel to line 33, which represents the pressure-temperature relation of the thermal bellows, throughout a normal working range of from 40 degrees C. to 100 degrees C. and that a relatively small variation (approximately 2 to 4 lbs.) from the normal transformer pressure with substantially no increase in temperature will shift curve 36 or 37 over bellows curve 33 thus throwing the system out of balance and actuating the protective device. Since the curves 36 and 37 are substantially parallel to curve 33 throughout the normal working range the protective device will respond as quickly to an abnormal pressure-temperature condition when the transformer is cold as when it is hot.

The following is a description of the operation of the protective system. Under normal operating conditions, an increase in the load upon the transformer 1 causes an increase in the temperature and the volume of the liquid 4 and a corresponding change in the temperature, volume, and pressure of the gas 6. Since the thermal bellows 9 and the pressure responsive diaphragm 8 have been proportioned as substantially to counterbalance each other under normal operating conditions no significant movement of connecting rod 10 results. Upon the occurrence of an electrical fault in the transformer such as a breakdown of insulation accompanied by an arc, a rapid evolution of gas and a consequent rapid increase in pressure will take place within the casing 5, thereby creating an abnormal condition. Since the pressure of the gas 6 will increase at a faster rate than the normal corresponding temperature of the liquid 4, the force exerted by the pressure responsive diaphragm 8 will overpower the normally counterbalancing force exerted by the temperature responsive bellows 9 to cause movement of connecting rod 10 and thus actuate switch 27. By the closing of the over-pressure contacts in switch 27 in this manner, a current is caused to pass through tripping coil 29 thus disconnecting the transformer 1 from the power circuit 2 to avoid any further damage.

In the opertaion of the protective device as a leak detector, when the pressure in the casing 5 drops below the normal pressure value as determined from the normal pressure temperature characteristic for that particular transformer design (curves 36 and 37), the force exerted by the thermal responsive bellows 9 will overpower the counteracting force exerted by pressure responsive diaphragm 8 to cause movement of rod 10 and thus actuate switch 27. By closing of the under-pressure contacts in switch 27 in this manner, a current is caused to pass through signal device 30, such as a bell or lamp, thereby attracting the attention of the attendant and warning him of the under-pressure condition. It should be noted that the application of the protective device as a leak detector is designed to operate throughout the normal operating range of the transformer from 40 degrees C. to 100 degrees C.

While there has been shown and described a particular embodiment of the invention it will be obvious to those skilled in the art that changes and modifications can be made without departing from the invention, and, therefore, it is aimed in the appended claims to cover all such changes and modifications.

What I claim as new and desire to secure by Letters Patent of the United States is:

1. A protective device responsive to pressure and temperature for use with liquid-immersed electrical apparatus, said device comprising a pressure responsive member for producing a force proportional to the pressure in said liquid, a temperature responsive member for producing a force proportional to the temperature of said same liquid, means connecting said members for opposing action, said members normally counterbalancing each other whereby no movement of said connecting means results, said pressure responsive member being constructed and arranged to overcome the force exerted by said temperature responsive means upon occurrence of a fault in said electrical apparatus creating a pressure increase to cause movement of said connecting means, said pressure responsive member also being constructed and arranged to be unbalanced from its normal position by a force exerted by said temperature responsive member which opposes and overcomes the force of said pressure responsive member upon the occurrence of a leak in the housing of said electrical apparatus creating a pressure decrease below normal to cause movement of said connecting means, and protective means adapted to be actuated by said connecting means upon movement thereof.

2. A pressure temperature relay for use with liquid-immersed electrical apparatus, said relay comprising a pressure responsive member for producing a force proportional to the pressure in said liquid, a temperature responsive member for producing a force proportional to the temperature of said same liquid, means connecting said members for opposing action, said members normally counterbalancing each other whereby no movement of said connecting means results, said pressure responsive member being constructed and arranged to overcome the force exerted by said temperature responsive means upon occurrence of a fault in said electrical apparatus creating a pressure increase to cause movement of said connecting means, and protective means adapted to be actuated by said connecting means upon movement thereof.

3. A pressure temperature relay for use with liquid-immersed electrical apparatus, said relay comprising a pressure responsive member for producing a force proportional to the pressure in said liquid, a temperature responsive member for producing a force proportional to the temperature of said same liquid, means connecting said members for opposing action, said members normally counterbalancing each other whereby no movement of said connecting means results, said temperature responsive member being constructed and arranged to overcome the force exerted by said pressure responsive member upon a decrease in normal pressure in the housing of said electrical apparatus from leakage to cause movement of said connecting means, and protective means adapted to be actuated by said connecting means upon movement thereof.

4. A protective device responsive to pressure and temperature for use with liquid-immersed electrical apparatus, said device comprising a pressure responsive member for producing a force proportional to the pressure in said liquid, a temperature responsive member for producing a force proportional to the temperature of said same liquid, means connecting said members for opposing action, said members normally counterbalancing each other whereby no movement of said connecting means results, said pressure responsive member being constructed and adapted so that throughout a normal operating range of 40° C. to 100° C. an increase in total pressure on the pressure responsive means of approximately 4 lbs. with substantially no increase in temperature will overcome the opposing force of said temperature responsive member to cause movement of said connecting means, and an electric switch adapted to be actuated by said connecting means upon movement thereof.

5. A pressure temperature relay for use in a sealed housing containing liquid-immersed electrical apparatus, said relay comprising a pressure responsive member for producing a force proportional to the pressure in said liquid, a temperature responsive bellows for producing a force proportional to the temperature of said same liquid, means connecting said pressure responsive member and said bellows for opposing action, said pressure responsive member and said bellows normally counterbalancing each other whereby no movement of said connecting means results, said pressure responsive member being constructed and arranged to overcome the force exerted by said bellows upon occurrence of a fault in said electrical apparatus to cause movement of said connecting means, and an electric switch adapted to be actuated by said connecting means upon movement thereof.

6. A relay responsive to temperature and pressure and adapted to be positioned in a wall of a housing for a liquid-immersed transformer, said relay comprising a diaphragm for producing a force proportional to the pressure in said liquid, a spring, a bellows filled with a temperature responsive fluid for producing a force proportional to the temperature of said same liquid, a rod for connecting said diaphragm and spring and said bellows, said diaphragm and spring normally counterbalancing said bellows whereby no movement of said connecting rod results and said diaphragm, said spring being constructed and arranged so that the forces exerted by it and said diaphragm will cooperate to overcome the opposing force exerted by said bellows upon occurrence of a fault in said transformer creating an increase in pressure to cause movement of said connecting rod, said bellows being constructed and arranged to overcome the force exerted by said diaphragm and spring upon a decrease in normal pressure in the housing of said transformer from leakage to cause movement of said connecting rod, and an electric switch which is normally balanced in a neutral position and adapted to be actuated by said connecting rod upon movement thereof in either direction.

JAMES R. BARR.

REFERENCES CITED

The following references are of record in the file of this patent:

UNITED STATES PATENTS

| Number | Name | Date |
|---|---|---|
| Re. 15,929 | MacGahan | Oct. 7, 1924 |
| 1,899,746 | Brown | Feb. 28, 1933 |
| 2,094,191 | Sauzedde | Sept. 28, 1937 |
| 2,103,816 | Hart | Dec. 28, 1937 |
| 2,169,857 | Treanor | Aug. 15, 1939 |
| 2,220,902 | Hastings | Nov. 12, 1940 |
| 2,395,007 | Leupold | Feb. 19, 1946 |
| 2,439,931 | Hodnette | Apr. 20, 1948 |